United States Patent
Bratton et al.

(10) Patent No.: US 6,635,594 B1
(45) Date of Patent: Oct. 21, 2003

(54) MEMBRANE PRE-TREATMENT PROCESS

(75) Inventors: Graham John Bratton, Sidcup (GB); Karon Doreen Buck, Fawkham (GB); Timothy de Villiers Naylor, Englefield Green (GB); Martin Grayling Major, Welling (GB)

(73) Assignee: Smart (Isle of Man) Limited, Douglas (GB)

( * ) Notice: Subject to any disclaimer, the term of this patent is extended or adjusted under 35 U.S.C. 154(b) by 0 days.

(21) Appl. No.: 09/806,817

(22) PCT Filed: Oct. 7, 1999

(86) PCT No.: PCT/GB99/03312

§ 371 (c)(1),
(2), (4) Date: Apr. 3, 2001

(87) PCT Pub. No.: WO00/21648

PCT Pub. Date: Apr. 20, 2000

(30) Foreign Application Priority Data

Oct. 10, 1998 (GB) .............................................. 9822056

(51) Int. Cl.[7] .................................................. B01J 29/06
(52) U.S. Cl. ............................... 502/4; 502/60; 502/64
(58) Field of Search ................................ 502/4, 60, 64

(56) References Cited

U.S. PATENT DOCUMENTS

| 5,114,581 A |   | 5/1992  | Goldsmith et al. ......... 210/650 |
| 5,407,880 A |   | 4/1995  | Ikeda et al. ..................... 502/67 |
| 5,468,699 A |   | 11/1995 | Lhang et al. .................. 502/60 |
| 5,935,440 A | * | 8/1999  | Bratton et al. ......... 210/500.25 |
| 6,383,563 B1 | * | 5/2002 | Bratton et al. ............... 427/244 |

FOREIGN PATENT DOCUMENTS

| EP | 0466396    |   | 1/1992  | ............. B01J/29/06 |
| EP | 0500154    |   | 8/1992  | ............. B01D/53/36 |
| EP | 0659469    |   | 6/1995  | ............. B01D/71/02 |
| WO | WO 93/19840 |   | 10/1993 | ............. B01D/71/02 |
| WO | WO 96/09110 |   | 3/1996  | ............. B01D/71/02 |
| WO | WO 00/20105 | * | 4/2000  |                          |
| WO | WO 00/21648 |   | 4/2000  | ............. B01D/71/02 |

* cited by examiner

Primary Examiner—Tom Dunn
Assistant Examiner—Christina Ildebrando
(74) Attorney, Agent, or Firm—Wenderoth, Lind & Ponack, L.L.P.

(57) ABSTRACT

An improved porous substrate for zeolite membranes is formed by coating the substrate with a layer of zeolite particles of a narrow particle distribution size of between 20 and 0.01 microns.

12 Claims, 5 Drawing Sheets

MEMBRANE PRE-TREATMENT PROCESS

Figure 1:
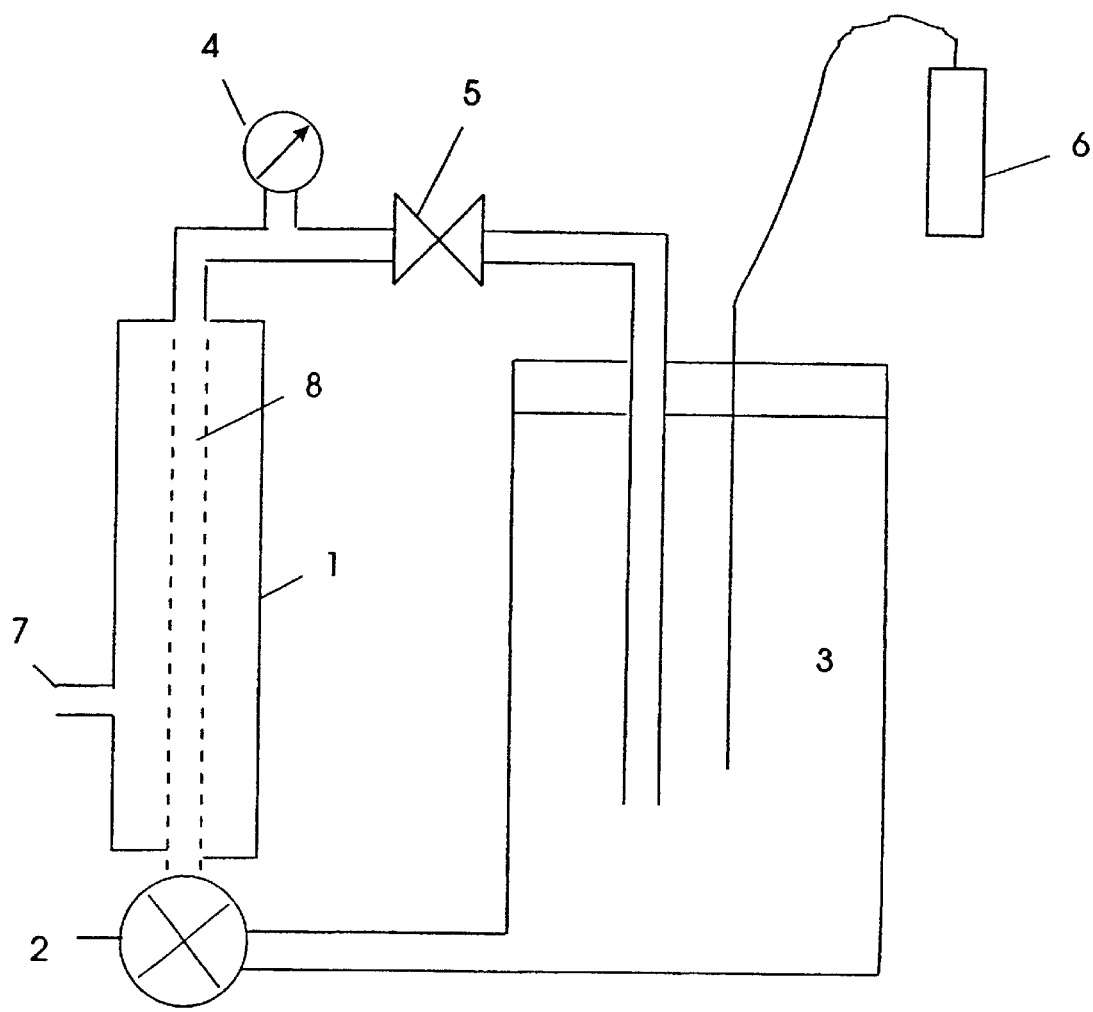

The present invention relates to a method for forming inorganic membranes, more particularly it relates to a method for forming zeolite membranes.

It is known to form zeolite membranes by crystallisation of zeolites from gel solution onto a substrate such as a metal mesh substrate or a porous ceramic substrate. The membranes which can be used in the present invention can be formed by any method, for example by crystallisation from a gel or solution, by plasma deposition or by any other method such as electro-deposition of crystals on conducting substrates e.g. as described in DE 4109037.

When the membrane comprising a film of zeo-type material is prepared by crystallisation from a synthesis gel, any of the methods described in the prior art can be used for example, as described in EP-A-57049. EP-A-104800. EP-A-2899 and EP-A-2900. Standard text books by D W Breck ("Zeolites Molecular Sieves, Structure Chemistry and Use") published by John Wiley (1974) and P. A Jacobs and J. A Martens (Studies in Surface Science and Catalysis No. 33, Synthesis of High Silica Alumino silicate Zeolites" published by Elsevier (1987), describe many such synthesis gels. The process which can be used includes conventional syntheses of zeo-type materials, except that the synthesis is carried out in the presence of the porous support. Most commonly, gels are crystallised by the application of heat.

Preferred methods are disclosed in our copending patent applications PCT/GB96/00243, PCT/GB97/00928 and PCT/GB 97/00635.

It is known to pre-treat the substrate before deposition of the zeolite onto the mesh e.g. as described in patent application U.S. Pat. No. 5,716,527.

We have now discovered a method of pre-treating a porous substrate to give an improved membrane.

According to the invention there is provided a method of treating a porous substrate which method comprises passing a suspension of zeolite particles in a liquid suspension though the porous support until a coating of zeolite particles is formed on the support surface and in which the particles have a diameter of between 20 $\mu$m and 0.1 $\mu$m.

We have found that a narrow size range of zeolite particles gives unexpectedly superior results.

Preferably the range of particles is achieved by mixing together particles of different size distribution. Zeolite particles, when prepared will have a particle size distribution, if these particles are ground or pulverised the average size is reduced and the distribution of sizes changed. If these particles are mixed with the unground particles a mixture can be obtained with a preferred size distribution for use in the present invention.

Preferably the zeolite particles are a mixture of particles which conforms approximately to a modified Fuller curve.

Fuller curves are grading curves which give the minimum void space and closest packing for sands and other mineral aggregates containing particles of varying sizes. The shape of the Fuller curve will depend on the maximum particle size, but will be a single curve for any given maximum particle size.

The Fuller curves are described in a paper by Fuller and Thomson entitled "The laws of Proportioning Concrete" published in the Transactions of the American Society of Civil Engineers, 1907, 59, pages 67–172. The Fuller curves are identified by their maximum particle size, e.g. in the present invention a preferred particle distribution is a 20 $\mu$m Fuller curve.

The porous supports on which zeo-type membranes are formed and which can be used in the present invention include those formed of metals, ceramics, glass, mineral, carbon or polymer fibres or cellulosic or organic or inorganic polymers. Suitable metals include titanium, chromium and alloys such as those sold under the Trade Marks "Fecralloy" and "Hastalloy" and stainless steels. The porous supports may be formed of a mesh or from sintered metal particles or a mixture of both. These are commonly sold in the form of filters.

Porous ceramics such as glass mineral or carbon materials are preferred including alumina, porous silicon and other carbides, clays and other silicates and porous silica. If desired, the support can be a zeolite formed by compression or using a binder. The shape of the support is not critical, for example, flat sheet, tubular, wound spiral, etc. can be used.

The porous support can be also be a granular solid e.g. formed of particles of a closely packed material such as a pellitised catalyst.

The present invention can be used with porous supports of any suitable size although, for large flux rates through a membrane, large pore sizes are preferred. Preferably pore sizes of 0.01 to 2,000 microns, more preferably of 0.1 to 200 and ideally of 0.1 to 20 microns are used. Pore sizes up to 300 microns can be determined by bubble point pressure as specified in ISO 4003. Larger pore sizes can be measured by microscopic methods.

The method of the present invention is particularly useful for forming a zeolite membrane on the inside of a tubular porous support e.g. in a ceramic monolith.

In this application of the method of the invention a suspension of the zeolite particles is passed through the bore of the tube and out through the walls of the tube so as to deposit a layer of zeolite membranes on the inner surface of the tube.

The process is continued until the desired thickness of particles are deposited on the inner surface or a predetermined flux of the liquid passes through the tube walls.

The suspension of zeolite particles is preferably an aqueous suspension of the particles and the suspension can be formed by forming a mixture of zeolite particles and water and grinding this mixture in a grinder until the particles are of the requisite size for use in the invention. The particles can be ground or milled in a conventional grinder or mill. Alternatively the particles can be reduced in size by a combination of shear, cavitation and impact e.g. as occurs in a microniser. These ground particles can be mixed with particles of a larger size so that the required particle size distribution is obtained.

After treatment a zeolite membrane can be formed on the treated substrate by any of the methods described in the prior art referred to above and the method is particularly useful when the membrane is formed by gel crystallisation.

The invention is described in the following example

EXAMPLE

The apparatus shown in FIG. 1 was used to deposit the zeolite particles, this apparatus consists of a reservoir vessel (3) connected via a circulating pump (2) capable of achieving flow rates of 16 l/min and a pressure of 35 psi. to the tubular membrane (8) which is held in an appropriate housing (1). The feed outlet is connected back to the reservoir vessel via a pressure gauge (4) and an adjustable valve (5) capable of totally restricting the feed flow. The permeate outlet (7) from the housing is also connected to the reservoir vessel via flexible tubing that allows samples of permeate flow to be taken over timed intervals. The temperature is monitored by temperature gauge (6).

The following method is used to deposit the zeolite crystals.

Figure 2:
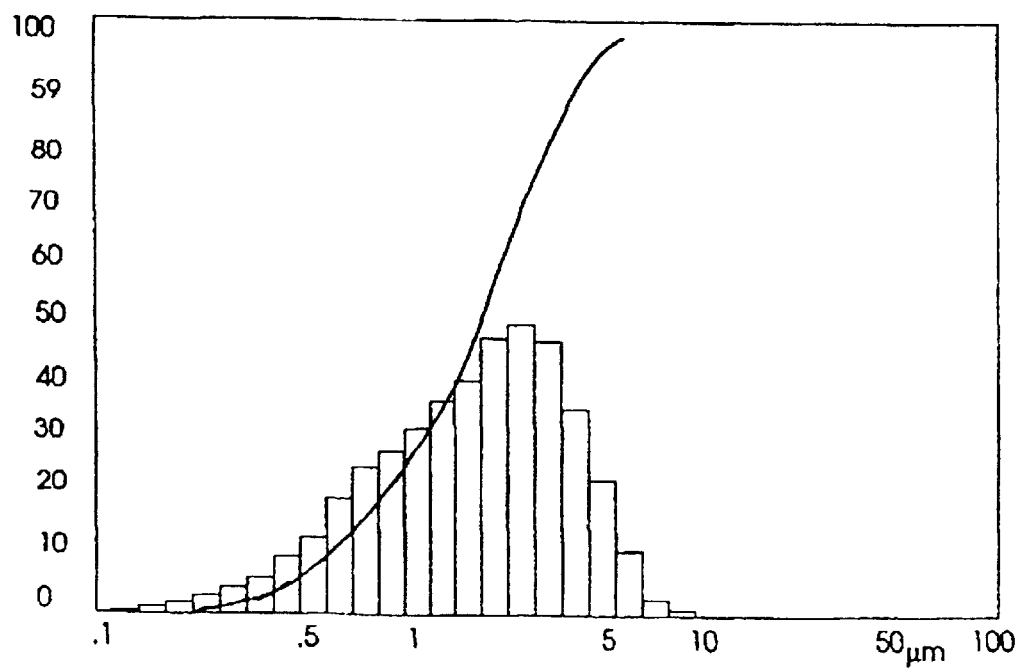
Figure 3:
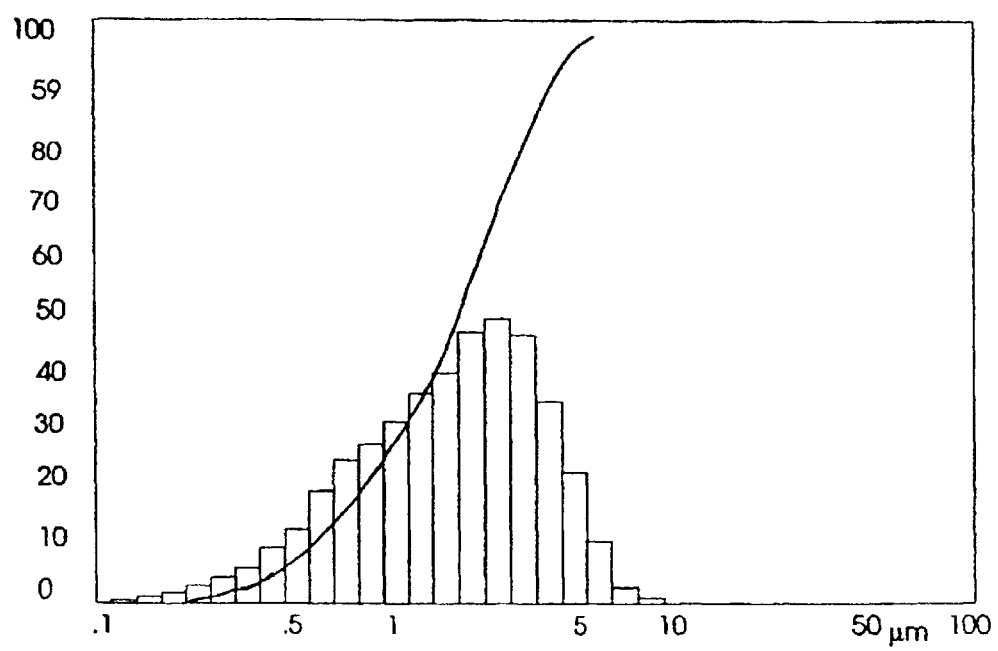

To 7 litres of distilled, deionised water are added 30 g of standard zeolite 4A particles having an overall particle size distribution between 20 $\mu$m and 0.1 $\mu$m as shown in FIG. 2 and 3 g of zeolite 4A particles that have been micronised to an overall size range between 20 and 0.1 $\mu$m, as shown in FIG. 3 as measured by a Fritsch Particle Size Analyser Model 22. The particle distribution before micronisation is shown in Table 1 and the particle distribution after micronisation is shown in Table 2 respectively.

TABLE 1

Particle size before micronisation (volume %)

| | | | |
|---|---|---|---|
| 00.50% | <0.20 $\mu$m | 00.90% | <0.24 $\mu$m |
| 03.32% | <0.43 $\mu$m | 04.30% | <0.49 $\mu$m |
| 05.00% | <0.53 $\mu$m | 10.00% | <0.77 $\mu$m |
| 15.00% | <1.02 $\mu$m | 20.00% | <1.33 $\mu$m |
| 30.00% | <2.16 $\mu$m | 40.00% | <3.15 $\mu$m |
| 50.00% | <4.05 $\mu$m | 60.00% | <4.88 $\mu$m |
| 70.00% | <5.75 $\mu$m | 80.00% | <6.75 $\mu$m |
| 90.00% | <8.29 $\mu$m | 99.00% | <12.62 $\mu$m |

TABLE 2

Particle size before micronisation (volume %)

Interpolation Values

| | | | |
|---|---|---|---|
| 00.50% | <0.17 $\mu$m | 00.90% | <0.19 $\mu$m |
| 03.32% | <0.30 $\mu$m | 04.30% | <0.34 $\mu$m |
| 05.00% | <0.37 $\mu$m | 10.00% | <0.53 $\mu$m |
| 15.00% | <0.66 $\mu$m | 20.00% | <0.79 $\mu$m |
| 30.00% | <1.05 $\mu$m | 40.00% | <1.35 $\mu$m |
| 50.00% | <1.69 $\mu$m | 60.00% | <2.05 $\mu$m |
| 70.00% | <2.47 $\mu$m | 80.00% | <2.97 $\mu$m |
| 90.00% | <3.69 $\mu$m | 99.00% | <5.64 m |

This suspension is circulated around the system under crossflow conditions for 1 minute (valve (5) fully open). Permeate is collected after this time for 30 seconds and weighed prior to returning it to the main reservoir. Valve (5) is fully closed for 1 minute to ensure all the flow passes through the walls of the porous support. Again the permeate is collected for 30 seconds, weighed and returned to the reservoir valve (5) is then fully opened for 1 minute.

This procedure of opening and closing the valve (5) is continued until the target flux through the porous medium is reached. For example for an alpha alumina porous substrate with a pore size range between 4.5 and 1.3, the target permeate flux is <50 cm$^3$ per minute in dead end flow conditions.

The tube is removed from the apparatus, allowed to dry at 70° C. for 3–4 hours

The zeolite membrane was formed on the inside of the support pre-treated with the particles by allowing a hydrogel suspension to be in contact with the surfaces under the conditions described below.

The hydrogel is formed by combining two separate solutions, (solution A) and (solution B) to from a homogeneous suspension.

Solution A 24.49 g Sodium Aluminate, 3.75 g Sodium Hydroxide and 179.74 g de-ionised water were mechanically shaken until dissolved. The Sodium Aluminate had an actual composition 62.48% Al2O3, 35.24% Na2O, and 2.28% H2O.

Solution B 50.57 g Sodium Silicate of composition 14.21% Na2O, 35.59% SiO2 and 50.20% H2O was dissolved in 148.8 g de-ionised water.

Solution A was heated to 50° C. and added slowly to solution B which had been pre-heated to 90° C. with stirring to ensure complete and even mixing (it is important that no lumps of hydrogel are formed). The mixture was then heated to 95° C. This resulted in a hydrogel having a molar composition

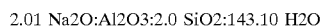

2.01 Na2O:Al2O3:2.0 SiO2:143.10 H2O

The pre-treated tube was wetted by immersing it in deionised water for 15 seconds. The tube was then suspended vertically above the bottom of the growth vessel. Hot hydrogel was then added to the growth vessel, care being taken to ensure that all the air was expelled from the inside of the support.

The growth vessel was sealed and heated to 100° C. for 5 hours.

After 5 hours the tube was removed from the growth vessel, allowed to cool slightly and then removed and washed clean using deionised water over a period of 16 hours. The ceramic tube was then dried at 100° C. for 6 hours.

X-ray Analysis showed this to be a Zeolite 4A.

A mixture of polysilicic acids of mean molecular weight of about 800 was diluted with ethanol to 5% wt. solids. 500 ml. of this solution was circulated over the feed side of the membrane and drawn through the membrane to treat the surface whilst being heated to 70° C., with vacuum for 5 hours to cross-link the silicic acid in the pores of the membrane.

The tubes were pre-treated with various particles and a zeolite membrane formed on the inner surface of the coated tubes as described above and the results described below.

In run 1 the pre-treatment used the mixture of particles formed as described in Example 1, with properties as described in Tables 1 and 2 above, followed by one zeolite growth.

In run 2 the pre-treatment used particles of Table 1 only followed by two zeolite crystal growths.

When only micronised particles of Table 2 were used it was not possible to form a vacuum.

The results for Runs 1 and 2 are shown below in Table 3.

TABLE 3

|  | Run 1 | Run 2 |
| --- | --- | --- |
| Tube weight clean (grms) | 298.43 | 298.83 |
| Tube vacuum (mbar) | 0.786 | 0.7895 |
| Tube weight after pre-treatment (grms) | 298.47 | 307.69 |
| Increase in weight (grms) | 0.04 | 8.86 |
| Tube vacuum after pre-treatment | 0.7202 | 0.69 |
| Weight after crystal growth | 299.79 | 304.14 |
| Increase in weight | 1.36 | −3.55 |
| Tube vacuum after growth | 0.0088 | 0.2144 |
| 2nd Growth |  |  |
| Weight after crystal growth |  | 305.76 |
| Increase in weight |  | 1.62 |
| Tube vacuum after growth |  | 0.045 |

Figure 4:
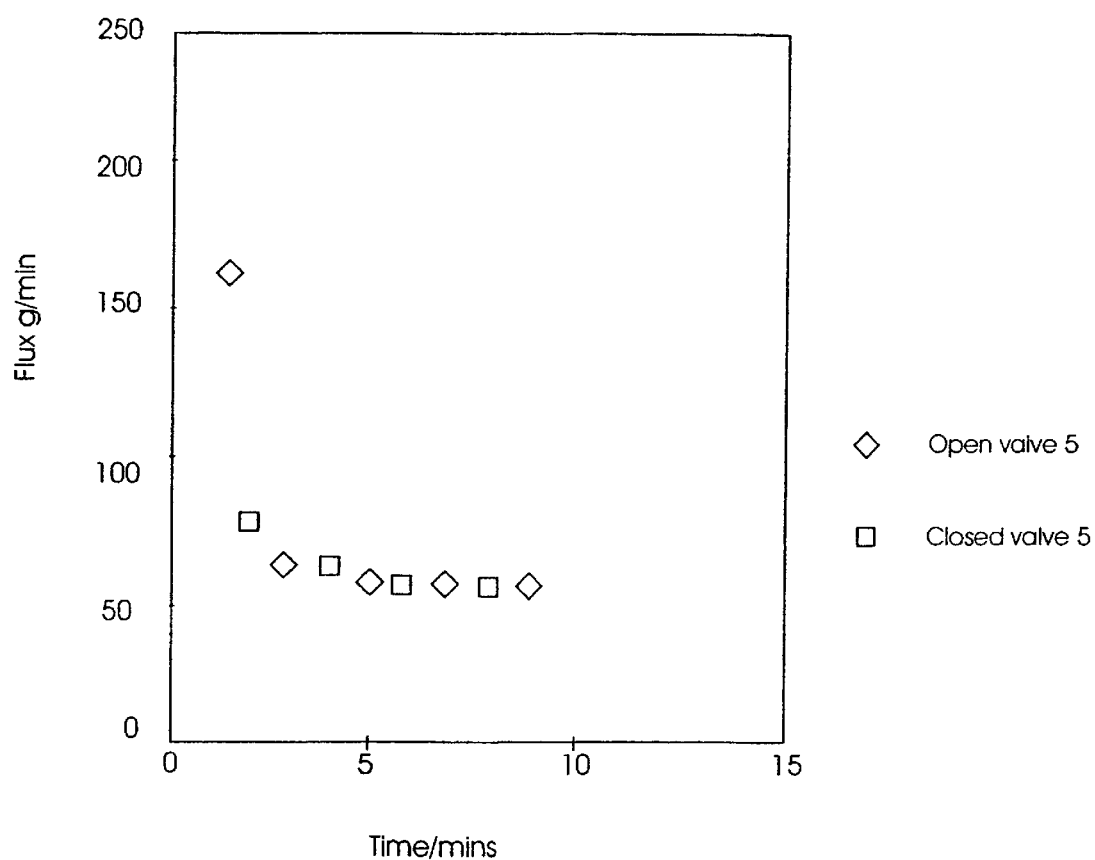
Figure 5:
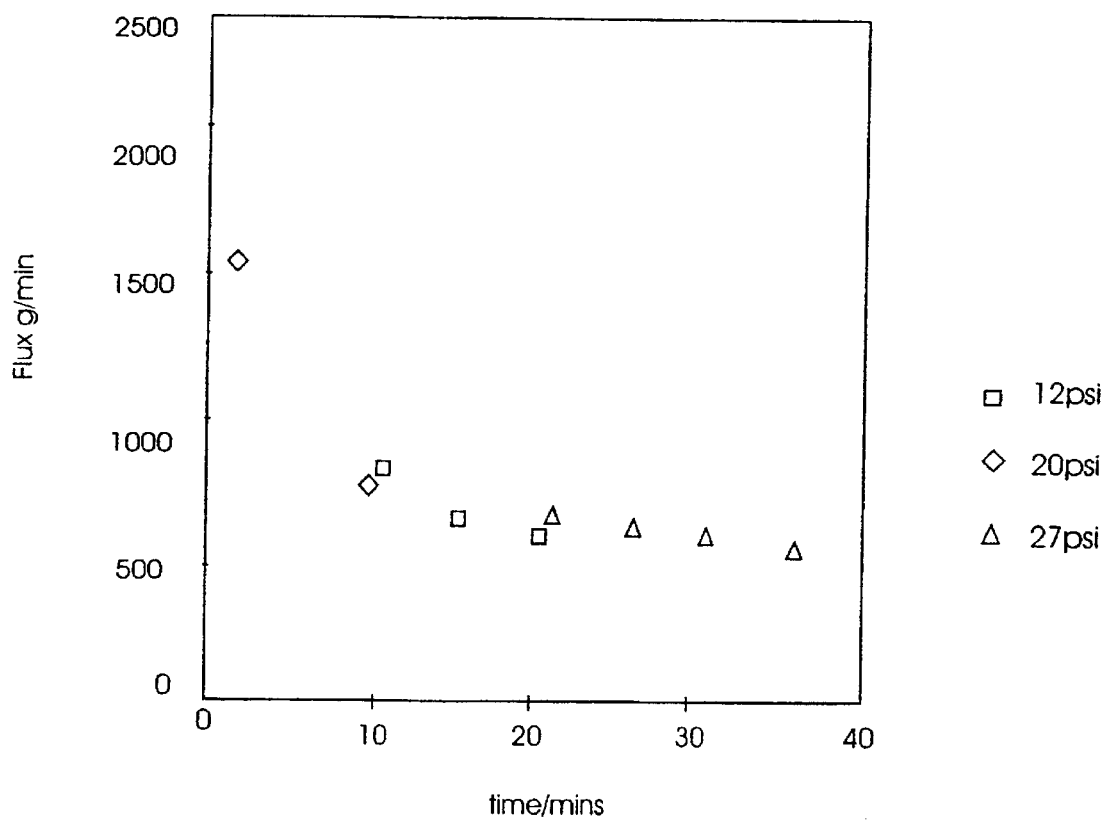

The flux characteristics for Run 1 are shown in FIG. 4 and the flux characteristics for Run 2 are shown in Table 5.

The performance of the membrane formed in Run 1 are given below in Table 4

TABLE 4

| Feed %/w/w | Permeate % w/w | Total Flux g/h | Water Flux g/h | Water Flux kg/m$^2$/d | Solvent Flux kg/m$^2$/d | Time hrs. |
| --- | --- | --- | --- | --- | --- | --- |
| 3.32 | 99.17 | 34.438 | 34.152 | 17.59 | 0.15 | 0.5 |
| 1.75 | 96.9 | 21.778 | 21.103 | 10.87 | 0.35 | 0.5 |
| 0.91 | 88.15 | 10.258 | 9.042 | 4.66 | 0.63 | 0.5 |
| 0.44 | 68.61 | 8.196 | 5.623 | 2.90 | 1.32 | 0.6 |

TABLE 5

| Feed %/w/w | Permeate % w/w | Total Flux g/h | Water Flux g/h | Water Flux kg/m$^2$/d | Solvent Flux. kg/m$^2$/d | Time. hrs. | Cum. Time hrs. |
| --- | --- | --- | --- | --- | --- | --- | --- |
|  |  |  | 0.000 | 0.00 | 0.00 | 0.0 | 0.0 |
| 3.99 | 99.34 | 31.640 | 31.431 | 15.62 | 0.10 | 0.5 | 0.5 |
| 2.55 | 98.48 | 22.32 | 21.894 | 10.88 | 0.17 | 0.5 | 1.0 |
| 1.55 | 94.23 | 14.618 | 13.775 | 6.85 | 0.42 | 0.5 | 1.5 |
| 0.94 | 83.74 | 9.760 | 8.173 | 4.06 | 0.79 | 0.5 | 2.0 |
| 0.58 | 62.68 | 7.668 | 4.730 | 2.35 | 1.46 | 0.5 | 2.5 |
| 0.36 | 35.08 | 7.390 | 2.592 | 1.29 | 2.38 | 0.5 | 3.0 |

As can be seen the mixture of particles of a range of sizes gives superior results.

What is claimed is:

1. A method of treating a porous substrate which has tubular conduits formed within it, which method comprises mixing together zeolite particles of different size distributions having a diameter of between 20 μm and 0.1 μm to form a suspension of the particles, passing the suspension of zeolite particles down through the tubular conduits and out through the walls of the tubular conduits so as to deposit a layer of zeolite particles on the inner surface of the tubular conduits.

2. A method as claimed in claim 1 which comprises forming a mixture of zeolite particles of different size distributions and water and grinding the mixture in a grinder until the particles are of the requisite size to obtain the mixture of zeolite particles.

3. A method as claimed in claim 2 which comprises pulverising zeolite particles and mixing the pulverised particles with unground particles to obtain the mixture of zeolite particles.

4. A method as claimed in claim 1 in which the zeolite particles of different size distributions are mixed together to obtain a distribution of particles which conforms approximately to a Fuller curve to form the mixture of zeolite particles.

5. A method as claimed in claim 1 in which the porous substrate is formed of a substrate selected from metal, ceramic, glass, mineral, carbon or polymer fibres, cellulosic, organic or inorganic polymers, a mesh or sintered metal particles, alumina, a carbide, a clay, a silicate, silicon carbide or porous silica.

6. A method as claimed in claim 5 in which the porous support has a pore size of 0.1 to 20 microns.

7. A method of forming a zeolite membrane on the inner surface of tubular conduits formed within a porous substrate, which method comprises (i) forming a mixture of zeolite particles having a range of diameters of between 20 μm and 0.1 μm (ii) passing a suspension of the mixture down through the tubular conduits and out through the walls of the tubular conduits so as to deposit a layer of zeolite particles on the inner surface of the tubular conduits and (iii) depositing or crystallising a zeolite membrane on the zeolite particles by gel crystallisation.

8. A method as claimed in claim 7 which comprises forming a mixture of zeolite particles of different size distributions and water and grinding this mixture in a grinder until the particles are of the requisite size to obtain the mixture of zeolites particles.

9. A method as claimed in claim 7 which comprises pulverising zeolites particles and mixing these pulverised particles with unground particles to obtain the mixture of zeolites particles.

10. A method as claimed in claim 7 in which the zeolite particles of different size distributions are mixed together to obtain a distribution of particles which conforms approximately to a Fuller curve to form the mixture of zeolites particles.

11. A method as claimed in claim 7 in which the porous substrate is formed of a substrate selected from metal, ceramic, glass, mineral, carbon or polymer fibres, cellulosic or organic or inorganic polymers, a mesh or sintered metal particles, alumina, carbide, clay, silicate, silicon carbide or porous silica.

12. A method as claimed in claim 11 in which the porous support has a pore size of 0.1 to 20 microns.

* * * * *